United States Patent
Chen et al.

(10) Patent No.: US 11,781,225 B2
(45) Date of Patent: Oct. 10, 2023

(54) SCALE CONTROL IN PRODUCTION FLUIDS

(71) Applicant: Saudi Arabian Oil Company, Dhahran (SA)

(72) Inventors: Tao Chen, Dhahran (SA); Qiwei Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/538,856

(22) Filed: Nov. 30, 2021

(65) Prior Publication Data

US 2023/0167558 A1    Jun. 1, 2023

(51) Int. Cl.
   *C23F 11/14*     (2006.01)
   *C09K 8/54*      (2006.01)
   *E21B 43/16*     (2006.01)

(52) U.S. Cl.
   CPC ............ *C23F 11/149* (2013.01); *C09K 8/54* (2013.01); *C23F 11/141* (2013.01); *E21B 43/16* (2013.01); *C09K 2208/06* (2013.01); *C09K 2208/32* (2013.01)

(58) Field of Classification Search
   None
   See application file for complete search history.

(56) References Cited

U.S. PATENT DOCUMENTS

| | | | |
|---|---|---|---|
| 4,713,184 A | 12/1987 | Zaid | |
| 4,923,617 A | 5/1990 | Heilweil et al. | |
| 5,294,371 A | 3/1994 | Clubley et al. | |
| 8,323,417 B2 | 12/2012 | Fan et al. | |
| 9,447,657 B2 | 9/2016 | Parker | |
| 9,890,623 B2 | 2/2018 | Ghorbani et al. | |
| 11,015,069 B2 | 5/2021 | Xia et al. | |
| 2009/0114247 A1* | 5/2009 | Brown | C09K 8/52 134/2 |
| 2018/0340114 A1* | 11/2018 | Fouchard | E21B 37/06 |

OTHER PUBLICATIONS

Askari et al., "Downhole corrosion inhibitors for oil and gas production - a review," Applied Surface Science Advances 6, Dec. 2021, 23 pages.

Fingar et al., Application of corrosion inhibitors for steels in acidic media for the oil and gas industry: A review, Corrosion Science, 86, Sep. 2014, 17-41, 25 pages.

* cited by examiner

*Primary Examiner* — Charles R Nold (74) *Attorney, Agent, or Firm* — Fish & Richardson P.C.

(57) ABSTRACT

Methods for reducing scale deposition are provided. An exemplary method for reducing scale in an oilfield facility includes contacting a metallic surface with a production fluid including a film-forming surfactant selected from imidazolines, imidazolidines, amidoamines, isoxazolidines, fatty amines, α,β-unsaturated aldehydes, salts thereof, and combinations thereof, the production fluid including the film-forming surfactant in a concentration of at least about 200 ppm.

25 Claims, 6 Drawing Sheets

SCALE CONTROL IN PRODUCTION FLUIDS

TECHNICAL FIELD

The present disclosure is directed to controlling scale in oilfield production fluids.

BACKGROUND

Inorganic scale has been a persistent problem in many oil and gas production systems. Scale can precipitate in bulk solution or deposit onto surfaces within subterranean formations, wellbore production tubing, and topside facilities. Such precipitates and deposits can restrict hydrocarbon flow, damage equipment, induce localized corrosion, and interfere with oil-water separation. For example, scale has been known to interfere with, interrupt, or even stop oil production.

One approach to control scale formation has been to inject a mixture of a scale inhibitor and a corrosion inhibitor into a subterraneous formation, either continuously through chemical injection lines, or in batches through production tubing. If chemical injection lines are unavailable, batch injection, also referred to as squeeze treatment, must be utilized. However, there is a risk of subterranean formation damage when a large volume of inhibitors is injected into the formation. Also, there is also a risk of incompatibility between the conventional scale inhibitors and corrosion inhibitors when used in such applications.

Thus, there remains a need for improved processes for controlling scale deposition in oilfield facilities.

SUMMARY

An embodiment described herein provides a method for reducing scale in an oilfield facility. The method includes contacting a metallic surface with a production fluid including a film-forming surfactant selected from imidazolines, imidazolidines, amidoamines, isoxazolidines, fatty amines, α,β-unsaturated aldehydes, salts thereof, and combinations thereof, the production fluid including the film-forming surfactant in a concentration of at least about 200 ppm.

An embodiment described herein provides a method for forming and transporting a production fluid. The method includes injecting a film-forming surfactant selected from imidazolines, imidazolidines, amidoamines, isoxazolidines, fatty amines, α,β-unsaturated aldehydes, salts thereof, and combinations thereof into a subterranean formation including water to form the production fluid; and then transporting the production fluid through production tubing including a metallic inner surface. The production fluid includes the film-forming surfactant and water from the formation, and a concentration of the film-forming surfactant in the production fluid is at least about 200 ppm.

DETAILED DESCRIPTION

The present disclosure relates to methods for reducing scale deposition. In particular, the methods of the present disclosure can reduce scale precipitation and deposition onto metallic surfaces of an oilfield facility, even in facilities where chemical injection lines to a subterranean formation are unavailable. Production fluids formed and transported according to methods of the present disclosure can exhibit limited scale precipitation and deposition within production tubing.

Scale Control Methods

Provided in this disclosure are methods for reducing scale in an oilfield facility. The method includes contacting a metallic surface with a production fluid containing a film-forming surfactant selected from imidazolines, imidazolidines, amidoamines, isoxazolidines, fatty amines, α,β-unsaturated aldehydes, salts thereof, and combinations thereof, present in the production fluid in a concentration of at least about 200 ppm.

Figure 1:
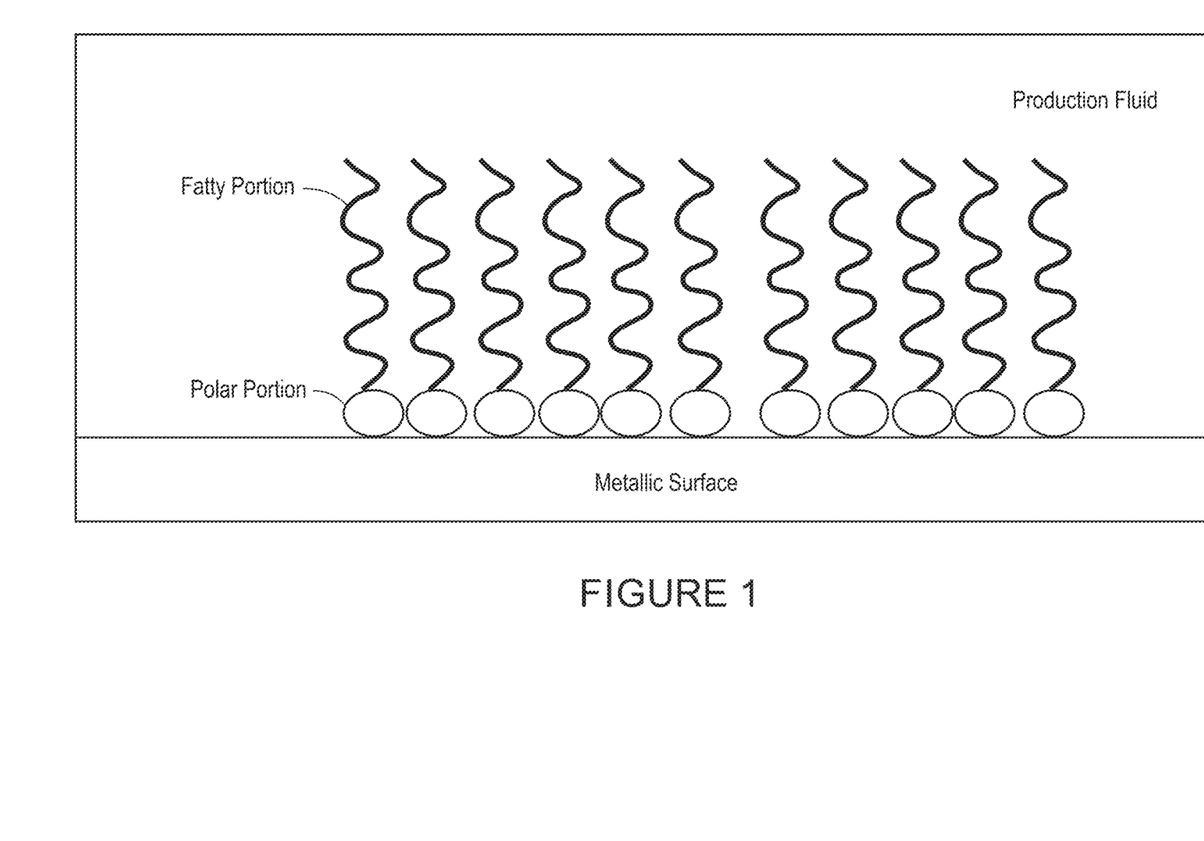
FIG. 1 is a schematic illustration of a film of a film-forming surfactant on a metallic surface.

As used in this disclosure, the term "film-forming surfactant" refers to compounds that adsorb onto a metallic surface, forming a film over at least a portion of the metallic surface. Film-forming surfactants may be cationic compounds. For example, film-forming surfactants may have an amphiphilic structure, and a polar group of the surfactants can adsorb onto a metallic surface. For example, FIG. 1 is a schematic illustration of a film of an exemplary film-forming surfactant adsorbed onto a metallic surface. The surfactant of FIG. 1 has an amphiphilic structure including a polar portion associated with the metallic surface and a fatty portion that can help to reduce or even prevent contact of a production fluid with the metallic surface. For example, the film-forming surfactant of FIG. 1 can be an ethoxylated fatty amine including a polar ethoxy-containing portion and a fatty portion.

In some embodiments, the concentration of the film-forming surfactant in the production fluid is about 200 ppm to about 5,000 ppm, such as about 200 ppm to about 4,000 ppm, or 200 ppm to about 3,000 ppm, or about 200 ppm to about 2,000 ppm, or about 200 ppm to about 1,000 ppm, for example, about 200 ppm to about 950 ppm, or about 200 ppm to about 900 ppm, or about 200 ppm to about 850 ppm, or about 200 ppm to about 800 ppm, or about 200 pm to about 750 ppm, or about 200 ppm to about 700 ppm, or about 250 ppm to about 1,000 ppm, or about 250 ppm to about 950 ppm, or about 250 ppm to about 900 ppm, or about 250 ppm to about 850 ppm, or about 250 ppm to about 800 ppm, or about 250 ppm to about 750 ppm, or about 250 ppm to about 700 ppm, or about 300 ppm to about 1,000 ppm, or about 300 ppm to about 950 ppm, or about 300 ppm to about 900 ppm, or about 300 ppm to about 850 ppm, or about 300 ppm to about 800 ppm, or about 300 ppm to about 750 ppm, or about 300 ppm to about 700 ppm, or about 350 ppm to about 1,000 ppm, or about 350 ppm to about 950 ppm, or about 350 ppm to about 900 ppm, or about 350 to about 850 ppm, or about 350 ppm to about 800 ppm, or about 350 ppm to about 750 ppm, or about 350 ppm to about 700 ppm, or about or about 400 ppm to about 1,000 ppm, or about 400 ppm to about 950 ppm, or about 400 ppm to about 900 ppm, or about 400 ppm to about 850 ppm, or about 400 ppm to about 800 ppm, or about 400 ppm to about 750 ppm, or about 450 to about 1,000 ppm, or about 450 to about 950 ppm, or about 450 ppm to about 900 ppm, or about 450 ppm to about 850 ppm, or about 450 ppm to about 800 ppm, or about 450 ppm to about 750 ppm, or about 450 ppm to about 700 ppm, or about 500 ppm to about 1,000 ppm, or about 500 ppm to about 950 ppm, or about 500 ppm to about 900 ppm, or about 500 ppm to about 850 ppm, or about 500 ppm to about 800 ppm, or about 500 ppm to about 750 ppm, or about 500 ppm to about 700 ppm. For example, the concentration of the film-forming surfactant in the production fluid is about 300 ppm, or about 350 ppm, or about 400 ppm, or about 450 ppm, or about 500 ppm, or about 550 ppm, or about 600 ppm, or about 650 ppm, or about 700 ppm, or about 750 ppm.

In some embodiments, the film-forming surfactant contains an imidazoline or a salt thereof. For example, the imidazoline or the salt thereof is present in the production fluid in a concentration of at least about 100 ppm, or at least about 200 ppm, or at least about 300 ppm, or at least about 400 ppm, or at least about 500 ppm. In other examples, the imidazoline or the salt thereof is present in the production fluid in a concentration of about 100 ppm to about 1,000 ppm, or about 150 ppm to about 1,000 ppm, or about 200 ppm to about 1,000 ppm, or about 250 ppm to about 1,000 ppm, or about 300 ppm to about 1,000 ppm, or about 350 ppm to about 1,000 ppm, or about 400 ppm to about 1,000 ppm, or about 450 ppm to about 1,000 ppm, or about 500 ppm to about 1,000 ppm, or about 100 ppm to about 750 ppm, or about 150 ppm to about 750 ppm, or about 200 ppm to about 750 ppm, or about 250 ppm to about 750 ppm, or about 300 ppm to about 750 ppm, or about 350 ppm to about 750 ppm, or about 400 ppm to about 750 ppm, or about 450 ppm to about 750 ppm, or about 500 ppm to about 750 ppm, or about 150 ppm to about 200 ppm, or about 250 ppm, or about 300 ppm, or about 350 ppm, or about 400 ppm, or about 450 ppm, or about 500 ppm.

In some embodiments, the film-forming surfactant contains fatty amine or a salt thereof. For example, the fatty amine or the salt thereof is present in the production fluid in a concentration of at least about 100 ppm, or at least about 200 ppm, or at least about 300 ppm, or at least about 400 ppm, or at least about 500 ppm. In other examples, the fatty amine or the salt thereof is present in the production fluid in a concentration of about 100 ppm to about 1,000 ppm, or about 150 ppm to about 1,000 ppm, or about 200 ppm to about 1,000 ppm, or about 250 ppm to about 1,000 ppm, or about 300 ppm to about 1,000 ppm, or about 350 ppm to about 1,000 ppm, or about 400 ppm to about 1,000 ppm, or about 450 ppm to about 1,000 ppm, or about 500 ppm to about 1,000 ppm, or about 100 ppm to about 750 ppm, or about 150 ppm to about 750 ppm, or about 200 ppm to about 750 ppm, or about 250 ppm to about 750 ppm, or about 300 ppm to about 750 ppm, or about 350 ppm to about 750 ppm, or about 400 ppm to about 750 ppm, or about 450 ppm to about 750 ppm, or about 500 ppm to about 750 ppm, or about 150 ppm, or about 200 ppm, or about 250 ppm, or about 300 ppm, or about 350 ppm, or about 400 ppm, or about 450 ppm, or about 500 ppm.

In some embodiments, the film-forming surfactant contains an imidazoline or a salt thereof, and a fatty amine or a salt thereof. For example, each of the imidazoline or the salt thereof and the fatty amine or salt thereof is independently present in the production fluid in a concentration of at least about 100 ppm, or at least about 200 ppm, or at least about 300 ppm, or at least about 400 ppm, or at least about 500 ppm. In some examples, the imidazoline or the salt thereof and the fatty amine or salt thereof is independently present in the production fluid in a concentration of about 100 ppm to about 1,000 ppm, such as a concentration of about 150 ppm, or about 200 ppm, or about 250 ppm, or about 300 ppm, or about 350 ppm, or about 400 ppm, or about 450 ppm, or about 500 ppm. In an example, each of the imidazoline or the salt thereof and the fatty amine or the salt thereof is present in the production fluid in a concentration of about 250 ppm.

In some embodiments, the film-forming surfactant contains a salt of an imidazoline or an imidazolidine, such as an acetate salt. The imidazoline can contain an amido group or an amino group, for example, a polyamine such as a diethylenetriamine. In some embodiments, the film-forming surfactant contains a compound of Formula I:

or a salt thereof, wherein:
$R^1$ is —H, $C_{1-22}$ alkyl, $C_{1-18}$ aminoalkyl, or $C_{1-18}$ amidoalkyl;
$R^2$ is —H or $C_{1-22}$ alkyl;
$R^3$, if present, is —H or $C_{1-22}$ alkyl; and
==== is a single bond and m is 1; or
==== is a double bond and m is 0.

For example, $R^1$ can be $C_{1-5}$ alkyl, or $C_{6-12}$ alkyl, or $C_{13-22}$ alkyl. In another example, $R^1$ is $C_{1-4}$ aminoalkyl, such as —$(CH_2)_{1-4}$—$NH_2$, or $C_{5-18}$ aminoalkyl, such as —$(CH_2)_{5-18}$—$NH_2$. In other examples, $R^1$ is $C_{1-4}$ amidoalkyl, such as —$(CH_2)_{1-4}$—$NC(O)R^4$, or $C_{5-18}$ amidoalkyl, such as —$(CH_2)_{5-18}$—$NC(O)R^4$, where $R^4$ is alkyl, such as $C_{1-6}$ alkyl. For example, Formula I, $R^2$ can be $C_{1-5}$ alkyl, or $C_{6-12}$ alkyl, or $C_{13-22}$ alkyl. In some embodiments, the imidazoline of Formula I is an acetate salt.

In certain examples of Formula I, $R^1$ is —H, and $R^2$ is $C_{1-22}$ alkyl, such as $C_{1-5}$ alkyl, or $C_{6-12}$ alkyl, or $C_{13-22}$ alkyl. In other examples of Formula I, $R^1$ is $C_{1-22}$ alkyl, such as $C_{1-5}$ alkyl, or $C_{6-12}$ alkyl, or $C_{13-22}$ alkyl, and $R^2$ is $C_{1-22}$ alkyl, such as $C_{1-5}$ alkyl, or $C_{6-12}$ alkyl, or $C_{13-22}$ alkyl. In some examples of Formula I, $R^1$ is $C_{1-22}$ alkyl, such as $C_{1-5}$ alkyl, or $C_{6-12}$ alkyl, or $C_{13-22}$ alkyl, and $R^2$ is —H. In certain examples of Formula I, $R^1$ is $C_{1-4}$ aminoalkyl, for example —$(CH_2)_{1-4}$—$NH_2$, or $C_{5-18}$ aminoalkyl, for example, —$(CH_2)_{5-18}$—$NH_2$, and $R^2$ is —H or $C_{1-22}$ alkyl, such as $C_{1-5}$ alkyl, or $C_{6-12}$ alkyl, or $C_{13-22}$ alkyl.

In some embodiments, the film-forming surfactant contains a fatty amine, for example, ($C_{6-22}$ alkyl)-N—$(R^5)_2$, where each $R^5$ is independently —H, alkyl, alkoxy, poly(alkoxy), or alkanol. Examples of fatty amines include dodecylamine, N,N-dimethyl dodecylamine, and the like. In various examples, the film-forming surfactant contains an alkoxylated fatty amine, for example, ($C_{6-22}$ alkyl)-N—$([(CH_2)_{1-30}]_n$—H)$_2$, such as an ethoxylated fatty amine, example, $(C_{6-22}$ alkyl)-N—$([CH_2CH_2O]_n$—H)$_2$, or an propoxylated fatty amine, for example, $(C_{6-22}$ alkyl)-N—$([CH_2CH_2CH_2O]n$-H)$_2$, where n is 1 or more.

In some embodiments, the film-forming surfactant contains a compound of Formula II:

or a salt thereof, wherein:
R$^5$ is C$_{6-22}$ alkyl; and
each n is independently 1 to 30.

In some embodiments of Formula II, R$^5$ is C$_{6-12}$ alkyl, or a C$_{13-22}$ alkyl. The alkyl may be a linear or a branched alkyl. In Formula II, each n is independently 1 to 25, or 1 to 20, or 1 to 15, or 1 to 10, or 2 to 30, or 2 to 25, or 2 to 20, or 2 to 15, or 2 to 10, or 5 to 30, or 5 to 25, or 5 to 20, or 5 to 15, or 5 to 10.

R$^5$ of Formula II can be linear C$_{6-12}$ alkyl, where each n is independently 1 to 30, 1 to 25, or 1 to 20, or 1 to 15, or 1 to 10, or 2 to 30, or 2 to 25, or 2 to 20, or 2 to 15, or 2 to 10, or 5 to 30, or 5 to 25, or 5 to 20, or 5 to 15, or 5 to 10. R$^5$ can be linear C$_{13-22}$ alkyl, where each n is independently 1 to 30, 1 to 25, or 1 to 20, or 1 to 15, or 1 to 10, or 2 to 30, or 2 to 25, or 2 to 20, or 2 to 15, or 2 to 10, or 5 to 30, or 5 to 25, or 5 to 20, or 5 to 15, or 5 to 10.

In some embodiments, the method includes contacting the metallic surface with the production fluid for a period of time sufficient to allow at least a portion of the film-forming surfactant to form a film on the metallic surface. The method can include contacting the metallic surface with the production fluid for a period of time longer than that necessary to allow at least a portion of the film-forming surfactant to form a film on the metallic surface. For example, the metallic surface is contacted with the production fluid for a period of at least about 1 min., or at least about 5 min., or at least about 15 min., or at least about 30 min., or at least about 1 hr., or at least about 2 hr., or at least about 6 hr., or at least about 12 hr., or at least about 18 hr., or at least about 24 hr.

In some embodiments, contacting the metallic surface with the production fluid forms a coating of the film-forming surfactant over at least about 10%, or at least about 20%, or at least about 30%, or at least about 40%, or at least about 50%, or at least about 60%, or at least about 70%, or at least about 80%, or at least about 90%, or at least about 95%, or at least about 97.5%, or at least about 99% of the metallic surface. The film formed from the film-forming surfactant may reduce scale deposition onto the metallic surface, and reduce corrosion of the metallic surface.

In some embodiments, the metallic surface contains stainless steel. For example, the metallic surface may be substantially stainless steel. The metallic surface may make up an inner surface of tubing, for example, containing stainless steel. The metallic surface contacted with the production fluid may be production tubing such as downhole completion tubing, coiled tubing, and the like.

In some embodiments, the method further includes injecting the film-forming surfactant into a subterranean formation to form the production fluid, which can be transported from the formation through production tubing of the present disclosure, such as stainless steel downhole completion tubing. The film-forming surfactant can be injected through chemical injection lines or through the production tubing.

In some embodiments, injecting the film-forming surfactant into the subterranean formation includes pumping a dose of the film-forming surfactant into the subterranean formation through production tubing, such as downhole completion tubing, as a batch. For example, the dose is at least 80 wt. %, or at least 85 wt. %, or at least 90 wt. %, or at least 95 wt. %, or at least 97.5 wt. %, or at least 99 wt. %, or at least 99.9 wt. % of the film-forming surfactant. The volume of a dose containing, for example, less than 20 wt % of other compounds, or substantially no other compounds, may be reduced as compared to a dose further including, for example, conventional scale inhibitors such as polymers containing acrylic acid monomer units, polymers containing maleic acid monomer units, and phosphonic acids. Examples of conventional scale inhibitors include, but are not limited to, polyphosphate, 1-hydroxyethylidenediphosphonic acid (HDEP), ethane-1,2-diphosphonic acid (EDPA), diethylenetriaminepenta(methylenephosphonic acid) (DETPMP), tris(phosphonomethyl)amine, nitrilotrimethylphosphonic acid, aminotris(methylphosphonic acid) (ATMP), bis(hexamethylenetriaminepenta(methylenephosphonic acid)) (BHTMP), 1-hydroxyethylidene-1,1-diphosphonic acid (HEDP), [[(2-hydroxyethyl)imino]bis(methylene)] bisphosphonic acid (MEA/HADMP), polyacrylic acid (PAA), polymaleic acid (PMA), polyphosphinocarboxylic acid (PPCA), polyvinyl sulfonate and polyacrylic acid copolymer (PVS), phosphonocarboxylic acid (POCA) and 2-phosphono-butane-1,2,4-tricarboxylic acid (PBTC), polyamino polyether methylene phosphonae (PAPEMP), polyaspartate, and mixtures thereof. A dose containing, for example, less than 20 wt % of other compounds, or substantially no other compounds, may exhibit a reduced risk of incompatibility between the film-forming surfactant and other compounds, for example, incompatibility with conventional scale inhibitors such as polymers containing acrylic acid monomer units, polymers containing maleic acid monomer units, and phosphonic acids.

In some embodiments, the dose contains 5 wt. % or less, 2.5 wt. % or less, 1 wt. % or less, or 0.5 wt. % or less of a total amount of polymers containing acrylic acid monomer units, polymers containing maleic acid monomer units, and phosphonic acids. For example, the dose is substantially free from polymers containing acrylic acid monomer units, polymers containing maleic acid monomer units, and phosphonic acids.

Injection of the dose, for example through production tubing such as downhole completion tubing, can form a production fluid of the present disclosure, for example, including a film-forming surfactant of the present disclosure in a concentration of at least about 300 ppm, or at least about 400 ppm, or at least about 500 ppm, or is about 200 ppm to about 1,000 ppm, or about 300 ppm to about 1,000 ppm, or about 400 ppm to about 1,000 ppm, or about 500 ppm to about 1,000 ppm.

In some embodiments, the production fluid contains water from a subterranean formation. In some embodiments, the production fluid contains one or more of Na$^+$, K$^+$, Ca$^{2+}$, Mg$^{2+}$, HCO$_3^-$, CO$_3^{2-}$, SO$_4^{2-}$, Cl$^-$, and ionic compounds thereof, for example, one or more of Ca$^{2+}$, CO$_3^{2-}$, and CaCO$_3$.

In some embodiments, calcium is present in the production fluid in a concentration of at least about 500 ppm, or at least about 750 ppm, or at least about 1,000 ppm, or at least about 1,250 ppm, or at least about 1,500 ppm, or at least about 1,750 ppm, or at or at least about 2,000 ppm, or at least about 2,500 ppm, or at least about 3,000 ppm, or about 500 ppm to about 20,000 ppm, or about 500 ppm to about 15,000 ppm, or about 500 ppm to about 10,000 ppm, or about 500 ppm to about 7,500 ppm, or about 500 ppm to about 5,000 ppm, or about 1,000 ppm to about 20,000 ppm, or about 1,000 ppm to about 15,000 ppm, or about 1,000 ppm to about 10,000 ppm, or about 1,000 ppm to about 7,500 ppm, or about 1,000 ppm to about 5,000 ppm, or about 1,500 ppm to about 20,000 ppm, or about 1,500 ppm to about 15,000 ppm, or about 1,500 ppm to about 10,000 ppm, or about 1,500 ppm to about 7,500 ppm, or about 1,500 ppm to about 5,000 ppm, or about 2,000 ppm to about 20,000 ppm, or about 2,000 ppm to about 15,000 ppm, or about 2,000 ppm to about 10,000 ppm, or about 2,000 ppm to about 7,500 ppm, or about 2,000 ppm to about 5,000 ppm, calculated as elemental calcium on a weight basis. For example, calcium is present in the production fluid in a concentration of about 1,000 ppm to about 10,000 ppm, such as a concentration of about 1,000 ppm, or about 2,000 ppm, or about 3,000 ppm, or about 4,000 ppm, or about 5,000 ppm, or about 6,000 ppm, or about 7,000 ppm, or about 8,000 ppm, or about 9,000 ppm, or about 10,000 ppm, calculated as elemental calcium on a weight basis.

In some embodiments, the production fluid contains $CaCO_3$ particles. The average size of the $CaCO_3$ particles present in the production fluid can be, in some examples, no more than 100 µm, or no more than 90 µm, or no more than 80 µm, or no more than 70 µm, or no more than 60 µm, or no more than 50 µm, or no more than 40 µm, or no more than 30 µm, or no more than 20 µm. For example, the average size of the $CaCO_3$ particles present in the production fluid is about 5 µm to about 50 µm, such as about 5 µm, about 10 µm, about 15 µm, about 20 µm, about 25 µm, about 30 µm, about 35 µm, about 40 µm, about 45 µm, or about 50 µm. The average size of the $CaCO_3$ particles present in the production fluid of the present disclosure may be reduced as compared to the average size of $CaCO_3$ particles present in a fluid including less than about 200 ppm of a film-forming surfactant of the present disclosure, for example in a fluid substantially free from a film-forming surfactant of the present disclosure. In some embodiments, at least a portion of the film-forming surfactant present in the production fluid is bound to a surface of at least a portion of the $CaCO_3$ particles present in the production fluid.

In some embodiments, the production fluid contains no more than about 50 ppm, or no more than about 40 ppm, or no more than about 30 ppm, or no more than about 20 ppm, or no more than about 10 ppm, or no more than about 5 ppm of a total amount of polymers containing acrylic acid monomer units, polymers containing maleic acid monomer units, and phosphonic acids. For example, the production fluid is substantially free from polymers containing monomer units, polymers containing maleic acid monomer units, and phosphonic acids.

Formation-Transportation Methods

Also provided in this disclosure are methods for forming and transporting a production fluid. The method includes injecting a film-forming surfactant of the present disclosure into a subterranean formation containing water to form the production fluid, and then transporting the production fluid through production tubing including a metallic inner surface. The production fluid includes the film forming surfactant and water from the formation, and the concentration of the film-forming surfactant in the production fluid is at least about 200 ppm.

In some embodiments of the formation-transportation methods, injecting the film-forming surfactant into the subterranean formation includes pumping a dose of the film-forming surfactant into the subterranean formation through the production tubing. For example, the dose is injected through downhole completion tubing, such as stainless steel downhole completion tubing.

In some embodiments of the formation-transportation methods, a dose of the present disclosure is injected into the subterranean formation through the production tubing, for example, as a batch. For example, the dose injected through the production tubing is at least 80 wt. %, or at least 85 wt. %, or at least 90 wt. %, or at least 95 wt. %, or at least 97.5 wt. %, or at least 99 wt. %, or at least 99.9 wt. % of the film-forming surfactant, and contains 5 wt. % or less, 2.5 wt. % or less, 1 wt. % or less, or 0.5 wt. % or less of a total amount of polymers containing acrylic acid monomer units, polymers containing maleic acid monomer units, and phosphonic acids.

In some embodiments of the formation-transportation methods, injecting a dose, such as a dose of the present disclosure, forms a production fluid of the present disclosure. For example, the concentration of the film-forming surfactant in the production fluid formed by injection of the dose through the production tubing is at least about 300 ppm, or at least about 400 ppm, or at least about 500 ppm, or is about 200 ppm to about 5,000 ppm, or about 200 ppm to about 1,000 ppm, or about 300 ppm to about 1,000 ppm, or about 400 ppm to about 1,000 ppm, or about 500 ppm to about 1,000 ppm.

Figure 2:
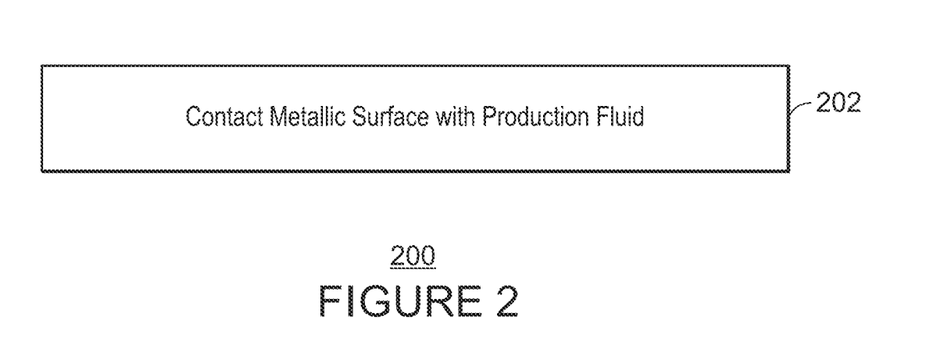
FIG. 2 is a process flow diagram of a method of reducing scale in an oilfield facility.

FIG. 2 is a process flow diagram of a method 200 of reducing scale in an oilfield facility. The method includes, at block 202, contacting a metallic surface with a production fluid containing a film-forming surfactant selected from imidazolines, imidazolidines, amidoamines, isoxazolidines, fatty amines, α,β-unsaturated aldehydes, salts thereof, and combinations thereof, the film-forming surfactant present in a concentration of at least about 200 ppm.

Figure 3:
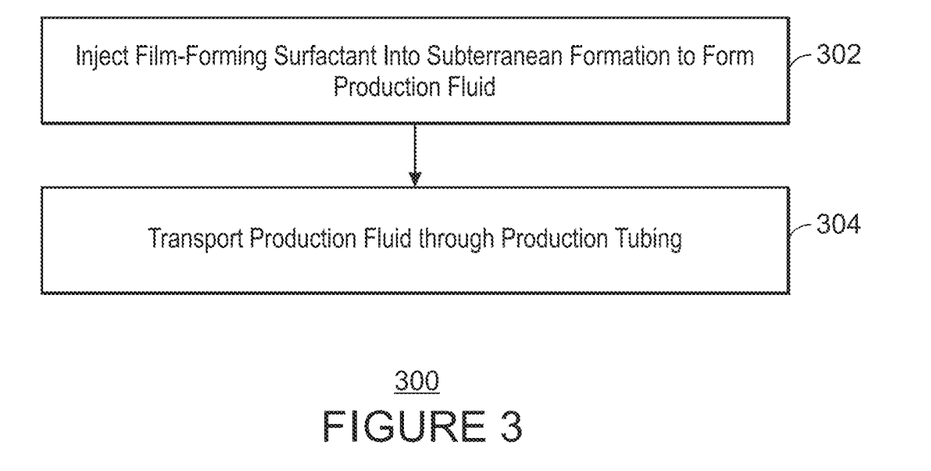
FIG. 3 is a process flow diagram of a method of forming and transporting a production fluid.

FIG. 3 is a process flow diagram of a method 300 of forming and transporting a production fluid. The method starts at block 302 with the injection of a film-forming surfactant selected from imidazolines, imidazolidines, amidoamines, isoxazolidines, fatty amines, α,β-unsaturated aldehydes, salts thereof, and combinations thereof into a subterranean formation containing water to form a production fluid containing water from the formation and the film-forming surfactant, present in a concentration of at least about 200 ppm. At block 304, the production fluid is transported through production tubing containing a metallic inner surface.

EXAMPLES

Example 1—Tube-Blocking Testing

Figure 4:
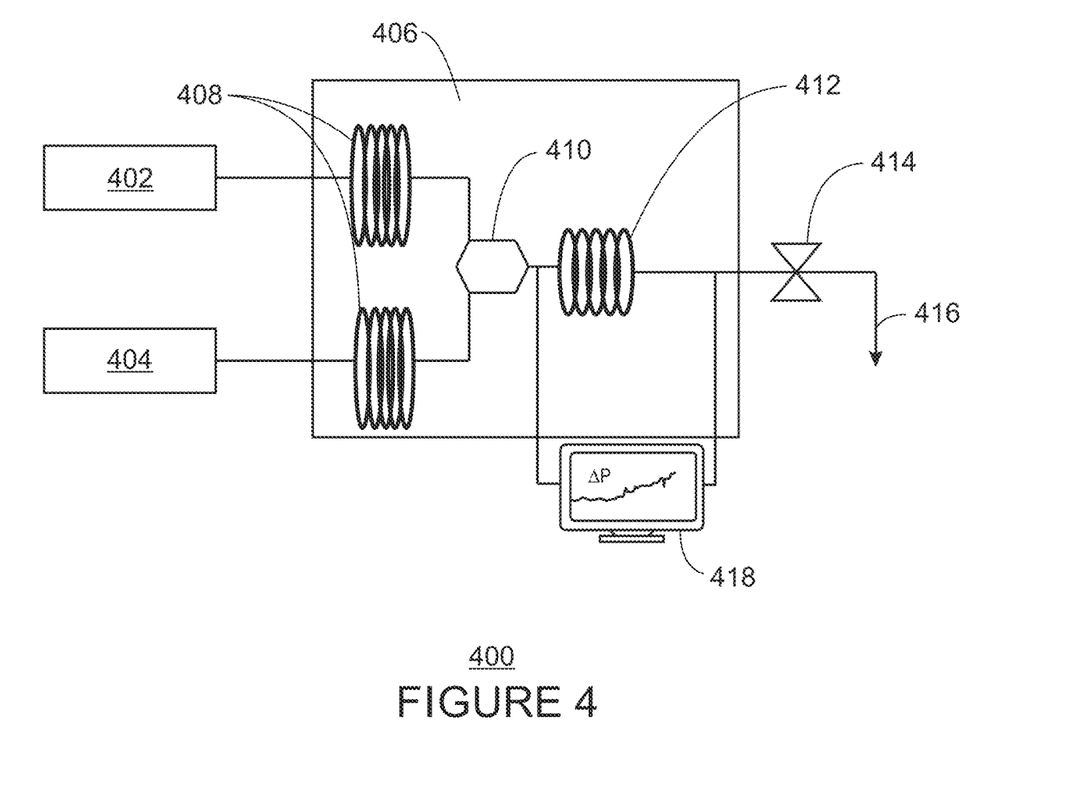
FIG. 4 is a schematic diagram of an exemplary dynamic tube-blocking apparatus used for measuring scale deposition.

Experiments were performed using a dynamic tube blocking apparatus at 185° F. (85° C.) designed to test scale deposition on a metal surface under simulated field conditions. A schematic diagram of this custom-built apparatus is shown in FIG. 4. Apparatus 400 of FIG. 4 includes pump 402 ("Pump A") and pump 404 ("Pump B"), and, in oven 406, preheating coils 408, mixing chamber 410, and scaling coil 412. In operation, fluids are pumped from pump 402 and pump 404, through the preheating coils 408, into the mixing chamber 410. After exiting the mixing chamber 410, fluids pass through the scaling coil 412, and then exit oven 406, through a back-pressure valve 414, via line 416. The pressure difference across scaling coil 414 is measured using detector 418. Cation and anion brines were pumped into the preheating coils separately at 5 ml/min. The preheated brines were comingled in a mixing chamber and then directed into the stainless-steel capillary coil (ID=1.0 mm, L=1 m). The mixing chamber increased the residence time of scaling brine in the test rig, which significantly improved the repeatability of test results and also allowed for tests of mild-scaling brines without requiring considerable changes to the brine composition or test temperature. The pressure difference (ΔP) across the capillary coil was measured continuously and recorded. Formation of scale deposition was indicated by ΔP increase with time.

The composition of the test brine is shown in Table 1, below, which is characterized by elevated calcium ions and total dissolved salts.

TABLE 1

Test Brine Composition

| Ion | Concentration (mg/L) |
| --- | --- |
| Sodium | 18420 |
| Potassium | 703 |
| Calcium | 3942 |
| Magnesium | 1286 |
| Bicarbonate | 500 |
| Sulfate | 485 |
| Chloride | 39120 |

Modeling with scale prediction software indicated that the water was supersaturated with respect to calcium carbonate scale. Synthetic brines were prepared with reagent-grade chemicals and used throughout the laboratory tests. Brine was divided into cation and anion solutions, so that a mixture of equal volumes of the two solutions would form the composition of Table 1. The anion brine contained sodium sulfate and sodium chloride salt, and the cation brine contained sodium chloride and calcium, magnesium, strontium and potassium ions. The prepared brines were filtered through 0.45 μm filter paper and degassed under vacuum for at least two hours before use. Bicarbonate salt ($NaHCO_3$) was added to the anion brine after degassing treatment, in order to minimize the change in pH due to the loss of carbon dioxide ($CO_2$).

Figure 5:
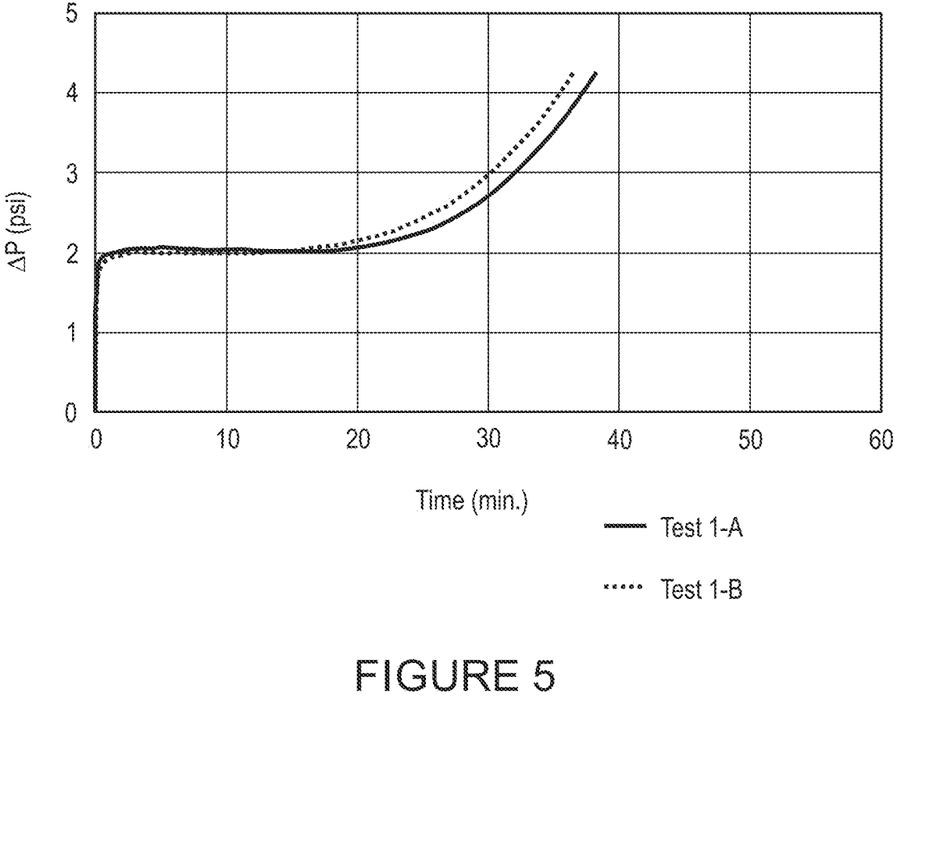
FIG. 5 is graph showing ΔP over time for a test brine free from imidazoline acetate and ethoxylated fatty amine.

Two sets of tests were conducted. In Tests 1-A and 1-B, no corrosion inhibitor was used. Pump A was used for cation solution and pump B was used for anion solution. Results showed that ΔP started to increase within 20 minutes, indicating the initiation of calcium carbonate scaling process. ΔP reached 1 psi in less than 35 minutes. Results are shown in FIG. 5.

In Test 2-A and 2-B, 1000 ppm of a mixture of imidazoline acetate and ethoxylated fatty amine was added to the anion brine. When the anion brine from Pump B was mixed with the cation brine from Pump A, the concentration of the mixture of imidazoline acetate and ethoxylated fatty amine in the final solution was 500 ppm.

Figure 6:
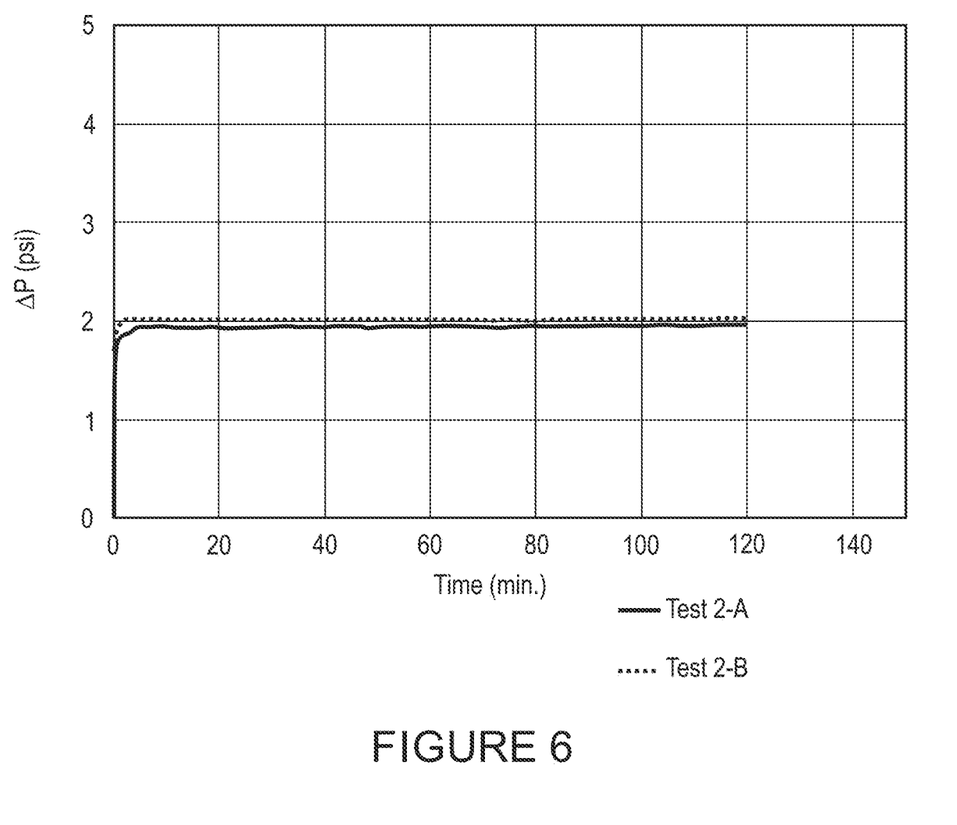
FIG. 6 is a graph showing ΔP over time for a test brine including 500 ppm of a mixture of imidazoline acetate and ethoxylated fatty amine.

Results are shown in FIG. 6. The imidazoline acetate-ethoxylated fatty amine mixture completely prevent scaling, as indicated by the lack of any ΔP increase over the extended test run of 120 minutes.

Example 2—Precipitation Tests

Additional tests were performed to evaluate the effect of imidazoline acetate and ethoxylated fatty amine on calcium carbonate bulk precipitation. Sample preparations were carried out at room temperature (~22° C.). Test bottles were first filled with 50 mL cation brine and then dosed with 0 or 1,000 ppm of a mixture of imidazoline acetate and ethoxylated fatty amine. After adding 50 mL anion brine, the test bottles were quickly sealed and then shaken to mix thoroughly, before placing the bottles into a preheated oven at 85° C.

After 24 hours, the bottles were visually examined. Visual observation showed no noticeable differences between the $CaCO_3$ precipitates formed with and without the imidazoline acetate and ethoxylated fatty amine present. The results suggest that the mixture of imidazoline acetate and ethoxylated fatty amine inhibited scale deposition onto the surface of test coil in Example 1, rather than scale precipitation in the bulk solution.

Figure 7:
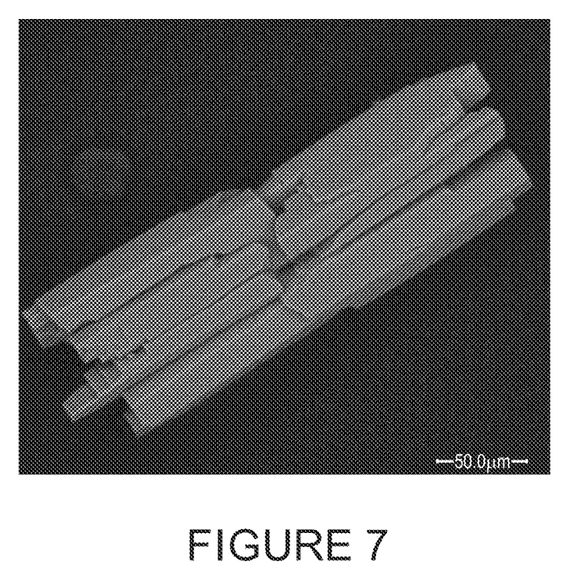
FIG. 7 is an ESEM image of $CaCO_3$ particles formed in the absence of imidazoline acetate and ethoxylated fatty amine.
Figure 8:
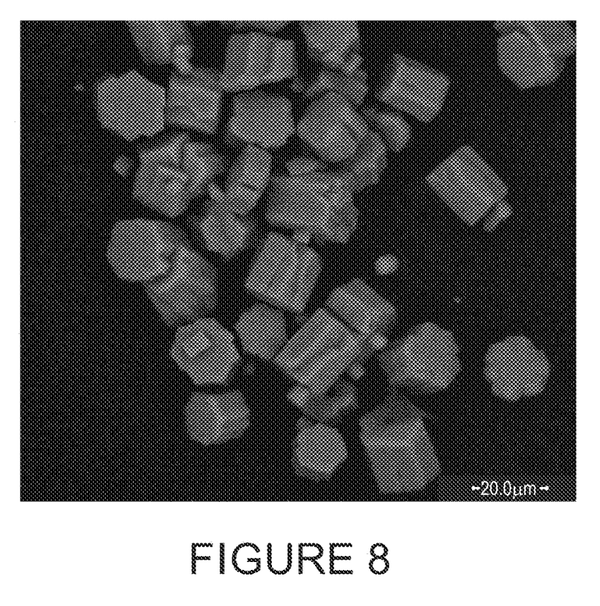
FIG. 8 is an ESEM image of $CaCO_3$ particles formed in the presence of 500 ppm of a mixture of imidazoline acetate and ethoxylated fatty amine.

At the end of the tests, the brine solution was filtered through a 0.45 μm filter. The retained solids were washed with DI water to remove residual dissolved salts and dried at 38° C. overnight, and then analyzed using an environmental scanning electron microscope (ESEM) to determine the size and shape of precipitated $CaCO_3$ scale particles. In samples lacking the imidazoline acetate-ethoxylated fatty amine mixture, the $CaCO_3$ precipitates were large sized (>100 microns) hexagonal columns with smooth surfaces (FIG. 7). In samples including the mixture, the $CaCO_3$ precipitates were much smaller, and in the form of short cylinders (FIG. 8). Without intending to be bound by any particular theory, the imidazoline acetate and ethoxylated fatty amine may affect the crystal morphology of precipitated scale, which may help inhibit scale deposition.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "downhole," as used in this disclosure, can refer to under the surface of the earth, such as a location within or fluidly connected to a wellbore.

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. A subterranean formation can be an oil well.

As used in this disclosure, the term "scale" can be used interchangeably with "mineral scale" and "inorganic scale" and refers to insoluble crystals that can precipitate from production fluid and can deposit onto surfaces of oil processing systems.

As used in this disclosure, the term "production fluid" refers to fluid that is recovered as part of a subterranean oil or gas extraction operation. A production fluid can include water, hydrocarbons, or both.

As used in this disclosure, the term "production tubing" refers to tubing that can be used to transport a production fluid as part of a subterranean oil or gas extraction operation. Production tubing can be located downhole, or can be located above the surface of the earth.

As used in this disclosure, the term "downhole completion tubing" refers to production tubing that can be used to transport a production fluid from a subterranean formation to the surface of the earth.

As used in this disclosure, the term "metallic surface" refers to surfaces containing an exposed metal or metal alloy.

As used in this disclosure, the term "alkoxylated fatty amine" refers to an amino group bonded to one optionally substituted fatty group, and further bonded to two independent alkoxy-containing groups. In some examples, the fatty group is linear $C_{6-22}$ alkyl. In some examples, each of the alkoxy-containing groups is independently a poly($C_{1-3}$ alkyloxy) group.

As used in this disclosure, the term "ppm" refers to parts per million, calculated on a weight basis.

As used in this disclosure, the term "size," used in reference to a particle, refers to a major dimension of the particle. For example, the size of a cylindrical particle is the greater of its diameter and its height. In another example, the size of a spherical particle is its diameter.

EMBODIMENTS

An embodiment described herein provides a method for reducing scale in an oilfield facility. The method includes contacting a metallic surface with a production fluid including a film-forming surfactant selected from imidazolines, imidazolidines, amidoamines, isoxazolidines, fatty amines, α,β-unsaturated aldehydes, salts thereof, and combinations thereof, the production fluid including the film-forming surfactant in a concentration of at least about 200 ppm.

In an aspect, the concentration of the film-forming surfactant in the production fluid is about 200 ppm to about 5,000 ppm. In an aspect, the concentration of the film-forming surfactant in the production fluid is about 350 ppm to about 1,000 ppm. In an aspect, the film-forming surfactant includes at least one of an imidazoline or a salt thereof and an alkoxylated fatty amine or a salt thereof.

In an aspect, the film-forming surfactant includes an imidazoline or a salt thereof, and the concentration of the imidazoline or salt thereof in the production fluid is at least about 100 ppm. In an aspect, the film-forming surfactant includes an imidazoline or a salt thereof, and the concentration of the imidazoline or salt thereof in the production fluid is about 200 ppm to about 1,000 ppm. In an aspect, the film-forming surfactant includes an alkoxylated fatty amine or a salt thereof, and the concentration of the alkoxylated fatty amine or salt thereof in the production fluid is at least about 100 ppm. In an aspect, the film-forming surfactant includes an alkoxylated fatty amine or a salt thereof, and the concentration of the alkoxylated fatty amine or salt thereof in the production fluid is about 200 ppm to about 1,000 ppm.

In an aspect, the film-forming surfactant includes a compound of Formula I:

(I)

or a salt thereof, wherein:
$R^1$ is —H, $C_{1-22}$ alkyl, $C_{1-18}$ aminoalkyl, or $C_{1-18}$ amidoalkyl; and
$R^2$ is —H or $C_{1-22}$ alkyl;
$R^3$, if present, is —H or $C_{1-22}$ alkyl; and
==== is a single bond and m is 1; or
==== is a double bond and m is 0.

In an aspect, the film-forming surfactant includes an acetate salt of the compound of Formula I, and wherein ==== is a double bond and m is 0.

In an aspect, the film-forming surfactant includes a compound of Formula II:

or a salt thereof, wherein:
R⁵ is $C_{6-22}$ alkyl; and
each n is independently 1 to 30.

In an aspect, the method including contacting the metallic surface with the production fluid for a period of time sufficient to allow at least a portion of the film-forming surfactant to form a film on the metallic surface. In an aspect, the metallic surface includes stainless steel. In an aspect, the metallic surface includes an inner surface of production tubing. In an aspect, the production tubing includes downhole completion tubing.

In an aspect, the method further includes injecting the film-forming surfactant into a subterranean formation to form the production fluid, and contacting the metallic surface includes transporting the production fluid from the subterranean formation through the production tubing. In an aspect, injecting the film-forming surfactant includes pumping the film-forming surfactant into the subterranean formation through the production tubing.

In an aspect, the production fluid includes water from a subterranean formation. In an aspect, the production fluid includes one or more of $Na^+$, $K^+$, $Ca^{2+}$, $Mg^{2+}$, $HCO_3^-$, $CO_3^{2-}$, $SO_4^{2-}$, $Cl^-$, and ionic compounds thereof. In an aspect, calcium is present in the production fluid in a concentration of at least about 500 ppm. In an aspect, calcium is present in the production fluid in a concentration of about 1,000 ppm to about 20,000 ppm.

In an aspect, the production fluid includes $CaCO_3$ particles, and an average size of the $CaCO_3$ particles present in the production fluid is no more than about 100 μm. In an aspect, the average size of the $CaCO_3$ particles present in the production fluid is no more than about 50 μm. In an aspect, at least a portion of the film-forming surfactant present in the production fluid is bound to a surface of at least a portion of the $CaCO_3$ particles.

In an aspect, the production fluid includes no more than 50 ppm of a total amount of polymers including acrylic acid monomer units, polymers including maleic acid monomer units, and phosphonic acids. In an aspect, the production fluid is substantially free from polymers including acrylic acid monomer units, polymers including maleic acid monomer units, and phosphonic acids.

An embodiment described herein provides a method for forming and transporting a production fluid. The method includes injecting a film-forming surfactant selected from imidazolines, imidazolidines, amidoamines, isoxazolidines, fatty amines, α,β-unsaturated aldehydes, salts thereof, and combinations thereof into a subterranean formation including water to form the production fluid; and then transporting the production fluid through production tubing including a metallic inner surface. The production fluid includes the film-forming surfactant and water from the formation, and a concentration of the film-forming surfactant in the production fluid is at least about 200 ppm.

In an aspect, the film-forming surfactant includes at least one of an imidazoline or a salt thereof and an alkoxylated fatty amine or a salt thereof. In an aspect, injecting the film-forming surfactant includes pumping a dose of the film-forming surfactant into the subterranean formation through the production tubing.

In an aspect, the dose is substantially free from polymers including acrylic acid monomer units, polymers including maleic acid monomer units, and phosphonic acids. In an aspect, the dose is substantially made up of the film-forming surfactant.

Other implementations are also within the scope of the following claims.

What is claimed is:

1. A method for reducing scale in an oilfield facility, the method comprising contacting a metallic surface with a production fluid comprising a film-forming surfactant, wherein the film-forming surfactant comprises:
an imidazoline or a salt thereof; and
an alkoxylated fatty amine or a salt thereof;
wherein a concentration of the imidazoline or salt thereof in the production fluid is about 200 ppm to about 1,000 ppm, and a concentration of the alkoxylated fatty amine or salt thereof in the production fluid is about 200 ppm to about 1,000 ppm.

2. The method of claim 1, wherein the concentration of the film-forming surfactant in the production fluid is about 200 ppm to about 5,000 ppm.

3. The method of claim 1, wherein the concentration of the film-forming surfactant in the production fluid is about 350 ppm to about 1,000 ppm.

4. The method of claim 1, wherein the film-forming surfactant comprises a compound of Formula I:

or a salt thereof, wherein:
R¹ is —H, $C_{1-22}$ alkyl, $C_{1-18}$ aminoalkyl, or $C_{1-18}$ amidoalkyl; and
R² is —H or $C_{1-22}$ alkyl;
R³, if present, is —H or $C_{1-22}$ alkyl; and
==== is a single bond and m is 1; or
==== is a double bond and m is 0.

5. The method of claim 4, wherein the film-forming surfactant comprises an acetate salt of the compound of Formula I, and wherein ==== is a double bond and m is 0.

6. The method of claim 1, wherein the film-forming surfactant comprises a compound of Formula II:

or a salt thereof, wherein:
R⁵ is $C_{6-22}$ alkyl; and
each n is independently 1 to 30.

7. The method of claim 1, comprising contacting the metallic surface with the production fluid for a period of time sufficient to allow at least a portion of the film-forming surfactant to form a film on the metallic surface.

8. The method of claim 1, wherein the metallic surface comprises stainless steel.

9. The method of claim 1, wherein the metallic surface comprises an inner surface of production tubing.

10. The method of claim 9, wherein the production tubing comprises downhole completion tubing.

11. The method of claim 9, further comprising injecting the film-forming surfactant into a subterranean formation to form the production fluid, wherein contacting the metallic surface comprises transporting the production fluid from the subterranean formation through the production tubing.

12. The method of claim 11, wherein injecting the film-forming surfactant comprises pumping the film-forming surfactant into the subterranean formation through the production tubing.

13. The method of claim 1, wherein the production fluid comprises water from a subterranean formation.

14. The method of claim 1, wherein the production fluid comprises one or more of $Na^+$, $K^+$, $Ca^{2+}$, $Mg^{2+}$, $HCO_3^-$, $CO_3^{2-}$, $SO_4^{2-}$, $Cl^-$, and ionic compounds thereof.

15. The method of claim 1, wherein calcium is present in the production fluid in a concentration of at least about 500 ppm.

16. The method of claim 1, wherein calcium is present in the production fluid in a concentration of about 1,000 ppm to about 20,000 ppm.

17. The method of claim 1, wherein the production fluid comprises $CaCO_3$ particles, and an average size of the $CaCO_3$ particles present in the production fluid is no more than about 100 μm.

18. The method of claim 17, wherein the average size of the $CaCO_3$ particles present in the production fluid is no more than about 50 μm.

19. The method of claim 17, wherein at least a portion of the film-forming surfactant present in the production fluid is bound to a surface of at least a portion of the $CaCO_3$ particles.

20. The method of claim 1, wherein the production fluid comprises no more than 50 ppm of a total amount of polymers comprising acrylic acid monomer units, polymers comprising maleic acid monomer units, and phosphonic acids.

21. The method of claim 1, wherein the production fluid is substantially free from polymers comprising acrylic acid monomer units, polymers comprising maleic acid monomer units, and phosphonic acids.

22. A method for forming and transporting a production fluid, the method comprising:
    injecting a film-forming surfactant into a subterranean formation comprising water to form the production fluid; and then
    transporting the production fluid through production tubing comprising a metallic inner surface;
wherein:
    the production fluid comprises the film-forming surfactant and water from the formation;
    the film-forming surfactant comprises an imidazoline or a salt thereof, and an alkoxylated fatty amine or a salt thereof; and
    a concentration of the imidazoline or salt thereof in the production fluid is about 200 ppm to about 1,000 ppm, and a concentration of the alkoxylated fatty amine or salt thereof in the production fluid is about 200 ppm to about 1,000 ppm.

23. The method of claim 22, wherein injecting the film-forming surfactant comprises pumping a dose of the film-forming surfactant into the subterranean formation through the production tubing.

24. The method of claim 23, wherein the dose is substantially free from polymers comprising acrylic acid monomer units, polymers comprising maleic acid monomer units, and phosphonic acids.

25. The method of claim 23, wherein the dose consists essentially of the film-forming surfactant.

* * * * *